United States Patent [19]
Monroe

[11] Patent Number: 5,912,902
[45] Date of Patent: Jun. 15, 1999

[54] DATA RECOVERY SCHEME

[76] Inventor: David A. Monroe, P.O. Box 780907, San Antonio, Tex. 78278-0907

[21] Appl. No.: 08/815,025

[22] Filed: Mar. 14, 1997

[51] Int. Cl.[6] .................................................. G06F 11/00
[52] U.S. Cl. ......................... 371/30; 371/37.02; 371/32; 375/316; 375/346; 375/347; 375/368; 395/182.16
[58] Field of Search ...................... 371/30, 37.02, 371/32; 375/346, 347, 316, 260, 368; 395/182.16

[56] References Cited

U.S. PATENT DOCUMENTS 5,745,532  4/1998  Campana, Jr. ........................ 375/347

*Primary Examiner*—William Grant
*Assistant Examiner*—McDieunel Marc
*Attorney, Agent, or Firm*—Bracewell & Patterson

[57] ABSTRACT

A method for configuring the data stream of an electronic transmission in order to minimize the amount of data lost due to the interruption of transmissions, incorporating the use of a buffer at the receiving station to collect data as it is received, and an "information packet" in combination with the typical "sync" signal to define what data is part of the transmitted data. The information packet defines, among other things, how much data preceeds and follows the sync signal. This permits the receiving system to look for lost data in both a forward and rearward direction in the transmission if it is interrupted, and to reconstruct the data, to minimize or even avoid a lost transmission.

15 Claims, 3 Drawing Sheets

DATA RECOVERY SCHEME

BACKGROUND OF INVENTION

1. Field of Invention

The subject invention is generally related to electronic data transmission over common carrier lines such as with wired or wireless telephone lines and is specifically directed to a method for recovering data lost due to noise and other interference signals occurring during transmission.

2. Discussion of the Prior Art

In recent years, the electronic creation and/or transmission and reception of data has exploded. The use of digital encoding, compression, transmission, decompression and decoding has made it possible to almost instantaneously transmit both visual and audio information to almost any location in the world. Examples of such applications include facsimile transmission of written or printed documents. For example, "fax" machines are now quite common, where an original document can be scanned and digitized, with the information representing the document being digitally transmitted of a phone line to a compatible receiving "fax" machine at any location, simply by dialing the telephone address of the receiving machine.

With the proliferation of electronic transmission of data, and the increasing speed of transmission, the potential for error in transmission due to noise and other interference has become more of an issue. This is particularly true when large volumes of data are transmitted during off hours when there often is no operator available to detect and intercept problem transmissions. For example, many large organizations routinely transmit documents at night. If such a transmission were interrupted by noise in the carrier lines, the transmission may be lost and no knowledge of the error would be found until the next morning. Another area of increasing concern is the transmission of data such as, by way of example, facsimile transmission, via cellular telephone systems, radio circuits and other non-hardwire transmission systems. There is inherent noise when switching cells as well as natural and man made interference, potentially causing a complete loss of transmission.

Typically, all electronic transmission schemes use an initializing scheme which is a "sign on" or initializing sequence to identify the sender and protocol. This usually begins with a sync and/or beginning of message signal (B-O-M) which identifies the beginning of a data transmission. This is generally followed by a header, after which the data flow begins. The data is often sent in blocks with FEC and CRC codes. For example, the header includes a cyclical redundancy check (CRC) which is repeated periodically throughout the message. At the end of the transmission, and end of message (E-O-M) signal is generated, and the transmission is completed. Typical protocols use CRC's to detect errors and FEC's to correct errors (on a limited basis) without retransmission, and with higher level protocol stacks to direct retransmission of detected lost data. Both use of FEC coding and retransmission require additional time to accomplish transmission. It would be far more desirable to minimize loss of data rather than retransmit it, particularly with real time correction or reconstruction. If the sync or B-O-M signal is missed, the entire data stream is lost. That is, when a transmission is initiated, a B-O-M signal is at the front end or beginning of the message. If the B-O-M signal is lost or missed, the data cannot be interrupted, and the entire transmission is lost. Once lost or interrupted, the transmission has to be resent with an identifying B-O-M signal. The only indication of an error is the failure to receive a reverse channel acknowledgment, if used, indicating that the transmission was interrupted prior to completion of the transmission.

A prior art and typical prior art transmission sequence are shown in FIG. 1. Typically, when an incoming bit stream is detected by a receiving system, as indicated at 10, the system looks for a sync signal (at 12). If a sync signal is detected, the system looks for a B-O-M signal (at 14), and if present, the data is collected (at 16). This process continues until an E-O-M signal is received (at 18), indicating completion of the transmission (at 20).

If either a sync signal or a B-O-M signal is not detected at the beginning of a bit stream, the transmission cannot be initiated. When noise is present or other interference interrupts the transmission, the system detects the next received bit in the data stream as a new transmission. It looks for a sync or B-O-M signal, and since none is present, the reception is not initiated, even though the sending station continues to send reliable data.

Therefore, it would be desirable if the receiving station had the capability to collect data both before and after an interruption point in order permit recovery of a "lost" transmission to permit recovery after interruption and "look back in time" for valid transmitted data. This would permit "reconstruction" of a lost transmission.

SUMMARY OF THE INVENTION

The subject invention is directed to a method for reconfiguring the data stream of an electronic transmission in order to improve uninterrupted transmission. The invention includes the use of a buffer at the receiving station to collect data as it is received, and an "information packet" in combination with the typical "sync" signal to define what data is part of the transmitted data. The information packet defines, among other things, how much data precedes and/or follows each sync signal. This permits the receiving system to look for lost data if the transmission is interrupted, and to reconstruct the data, avoiding a lost transmission. Specifically, if a transmission is interrupted all of the data up to the interruption and all of the data after the interruption is still valid. Typically, the interruption only interferes with a minute quantity of the transmitted data. By utilizing the information packet/sync signal of the present invention, all of the data within the assigned vicinity of the information packets on either side of the interruption can be confirmed, avoiding loss of data due to the interruption and permitting the transmission to continue.

In the preferred embodiment of the invention, the information packet is produced at the beginning of the transmission, immediately following the sync signals distributed throughout the message. The information packet includes information which will identify how much data is contained in the transmission between each sync signal so that the receiving system will be able to anticipate the amount of data to expect. Thus if a transmission is interrupted by noise, the receiving station will be operative to stay on line until as much data as possible is received. The station can "look" behind and ahead of each sync signal to assure a completed transmission and can confirm data on either side of the signal in the event of an interruption.

The receiving system includes a buffer system to collect and store incoming data received from a sending system during transmission, while at the same time processing the transmitted data in the well known manner. Once an information packet is recognized, all of the data will be recognized by the receiving system as it is transmitted. By placing all received data in the buffer, it can be found and reconstructed both forward and backwards, if a transmission is interrupted prior to completion.

The information packet is repeated at intervals permitting the buffer to be dumped before it reaches capacity. In the event a transmission is interrupted between information packet signals, all of the data received since the last information packet will be in the buffer. Since all data identified at the beginning of and throughout the transmission has not been received, the receiving system will know that the transmission has been interrupted prior to completion. However, the next bit received will not have a sync or initializing signal, and the receiving system will not be able to recognize it or to continue with the transmission, even though both the receiving and transmitting systems stay on line. During this period, the buffer continues to be loaded with the incoming, now unrecognized, bit stream. Since the system has the capability of looking both forward and backward at transmitted data, it can look for a synch signal or a B-O-M signal to determine how the unidentified transmitted data is to be recognized. This permits recovery of the lost data by recognizing that it belongs to a previously initiated transmission.

In the present invention, an information packet will be sent during this time period. This identifies the data, the position in the data stream where the packet is located, and how much additional information is to be expected. If this occurs after an interruption, the system will look into the buffer and retreat to the previous data packets. The information entered after the interruption and prior to the new information packet may now be recaptured and the entire data stream reconstructed.

As in the prior art, the collection sequence will continue until an E-O-M signal is received.

The buffer system of the preferred embodiment may be constructed from the available hardware in most personal or mini-computer systems, or in the micro-controller based or DSP based communication cards, or ASIC communication chips, or with other structure which will be known to those who are ordinarily skilled in the art, utilizing software management of the system. Typically, the buffer as it is simultaneously introduced into the receiving system. In a typical system the data serially advances the data through the receiving station collection sequence while all information received is stored in the memory. In the event of interruption, the receiving station cannot recognize any data that has not been initialized by the presence of a sync signal. In the present invention, since all data is in the buffer memory, this information can now be reconstructed.

It is, therefore, an object and feature of the subject invention to provide an improved data transmission scheme wherein lost data can be recaptured after a transmission has been interrupted.

It is also an object and feature of the subject invention, to provide a data transmission scheme wherein an interrupted transmission can be resumed without re-initialization.

It is yet another object and feature of the subject invention to provide a buffer for temporarily storing a bit stream of data to retain it in the event of a data loss or interruption during a transmission sequence.

Other objects and features of the invention will be readily apparent from the accompanying drawings and detailed description of the preferred embodiment.

DESCRIPTION OF THE PREFERRED EMBODIMENT

Figure 1:
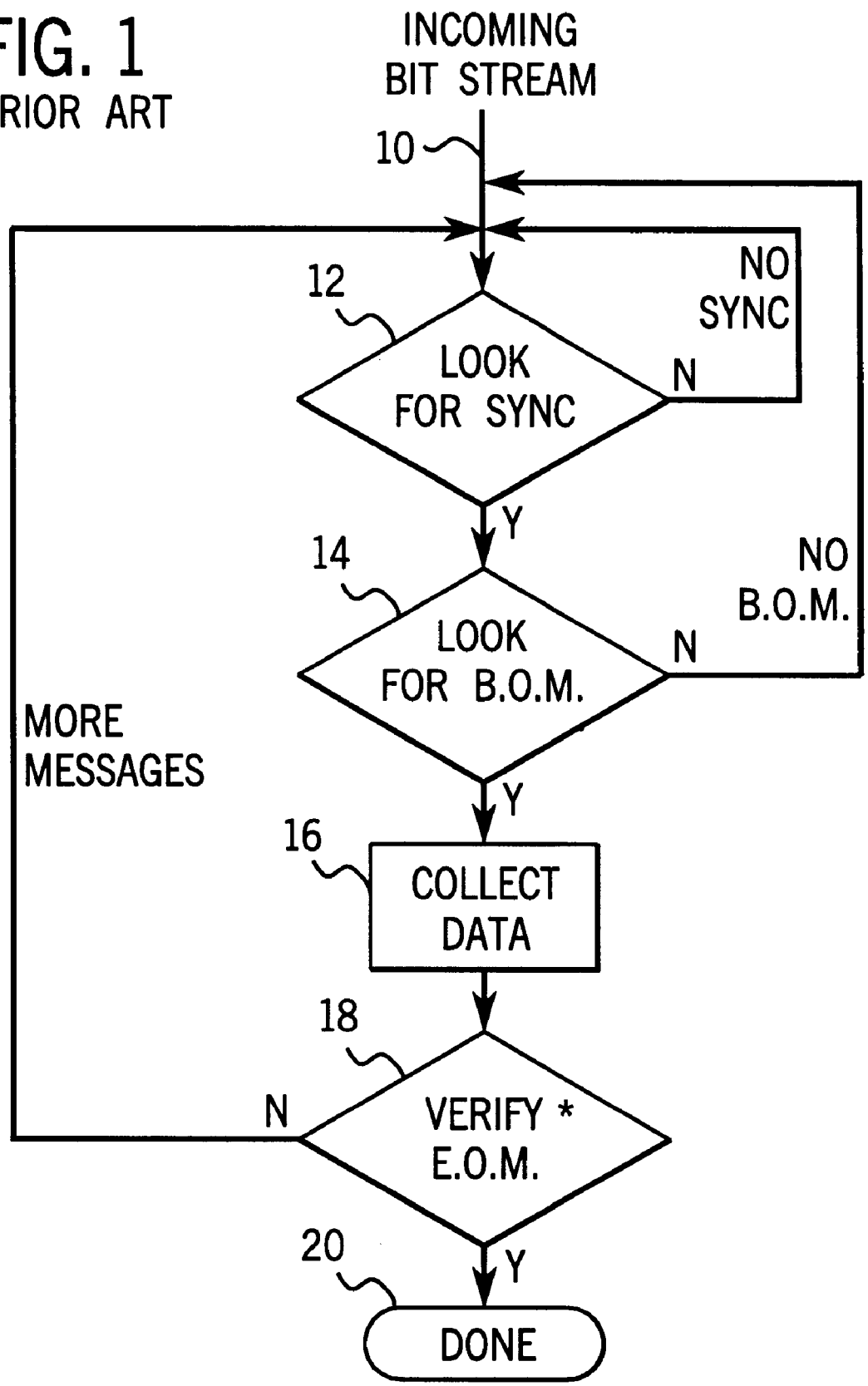
FIGS. 1 and 1A are illustrations of a prior art bit map and prior art receiving system data collection scheme.
Figure 1A:
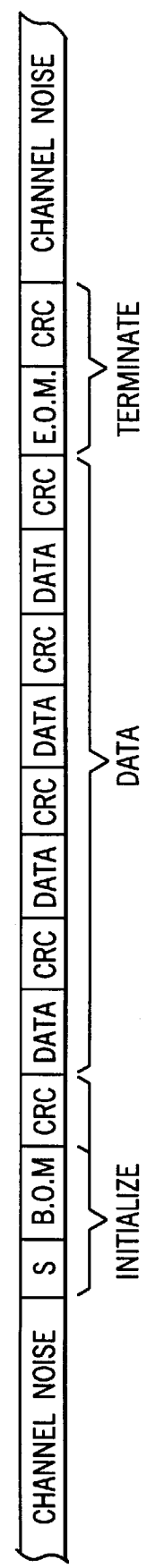
Figure 2A:
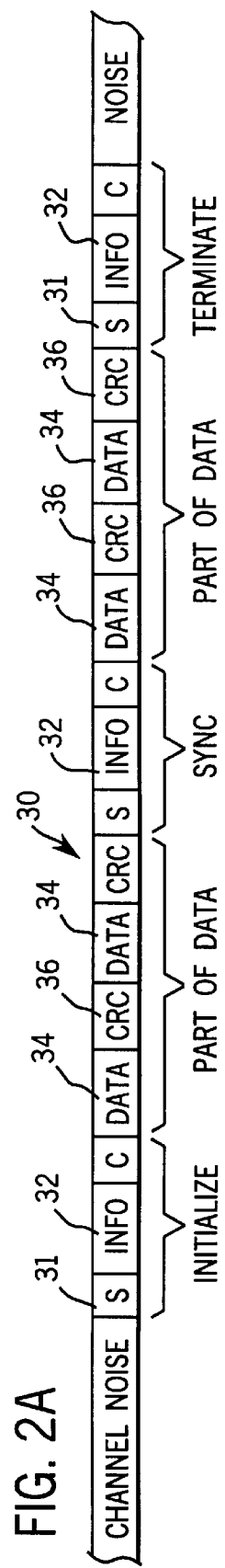
FIGS. 2 and 2A are illustrations of a bit map and receiving system data collection scheme in accordance with the subject invention.

The bit map 30 in accordance with the preferred embodiment of the subject invention is shown in FIG. 2A. As there shown, the prior art B-O-M is replaced by an information packet signal 32 as part of the initializing sequence, and follows the typical sync signal 31. The sync signal 31 defines the initiation of a transmission and signals the beginning of a data bit stream 40 to be collected by the receiving station, as diagrammatically indicated by the flow chart 50.

The information packet replaces the prior art beginning of message (B-O-M) signal and includes information stating beginning of the transmission, the length of the remaining transmission, or where in the transmission the packet is located if not at the beginning, how much data is present before the next packet and end of message at the end of the bit stream. The data stream 34 follows the information packet, with periodic CRC or cyclical redundancy check signals 36 being contained therein in typical fashion.

In the preferred embodiment of the invention, the receiving system includes a buffer 38. As the bit stream 40 enters the receiving system a sync signal is looked for, as at 42, and if detected, the information packet is looked for, as at 44. If neither the sync signal nor the information packet is present, the transmission is interrupted, as indicated at 45, 46. When both the sync signal and an information packet signal are detected, a data point is established at 48, based on the information in the information packet, and transmission continues until complete, as indicated at 49. The bit stream will continue to be received as part of the data transmission until and E-O-M signal is included in the last information packet, as indicated at 51. Once the transmission is complete, the receiving system is shut down, as indicated at 52 and is ready to receive a new transmission when a new initialization sequence occurs.

In the preferred embodiment of the subject invention, the incoming bit stream 40 is received in a the buffer system 38, where the data is collected and stored. By placing all received data in the buffer, it can be found and reconstructed if a transmission is interrupted prior to completion.

In the preferred embodiment, the information packet is cyclically repeated. Typically, the buffer is not designed to hold the entire bit stream of data. The information packet is repeated at intervals permitting the buffer to be dumped before it reaches capacity. In the event a transmission is interrupted between information packet signals, all of the data received since the last information packet will be in the buffer. Since all data identified at the beginning of the transmission has not been received, the receiving system will know that the transmission has been interrupted prior to completion. However, the next bit receive will not have a sync or initializing signal, and the receiving system will not be able to recognize it or to continue with the transmission, even though both the receiving and transmitting systems stay on line. During this period, the buffer continues to be loaded with the incoming, now unrecognized, bit stream.

Figure 2:
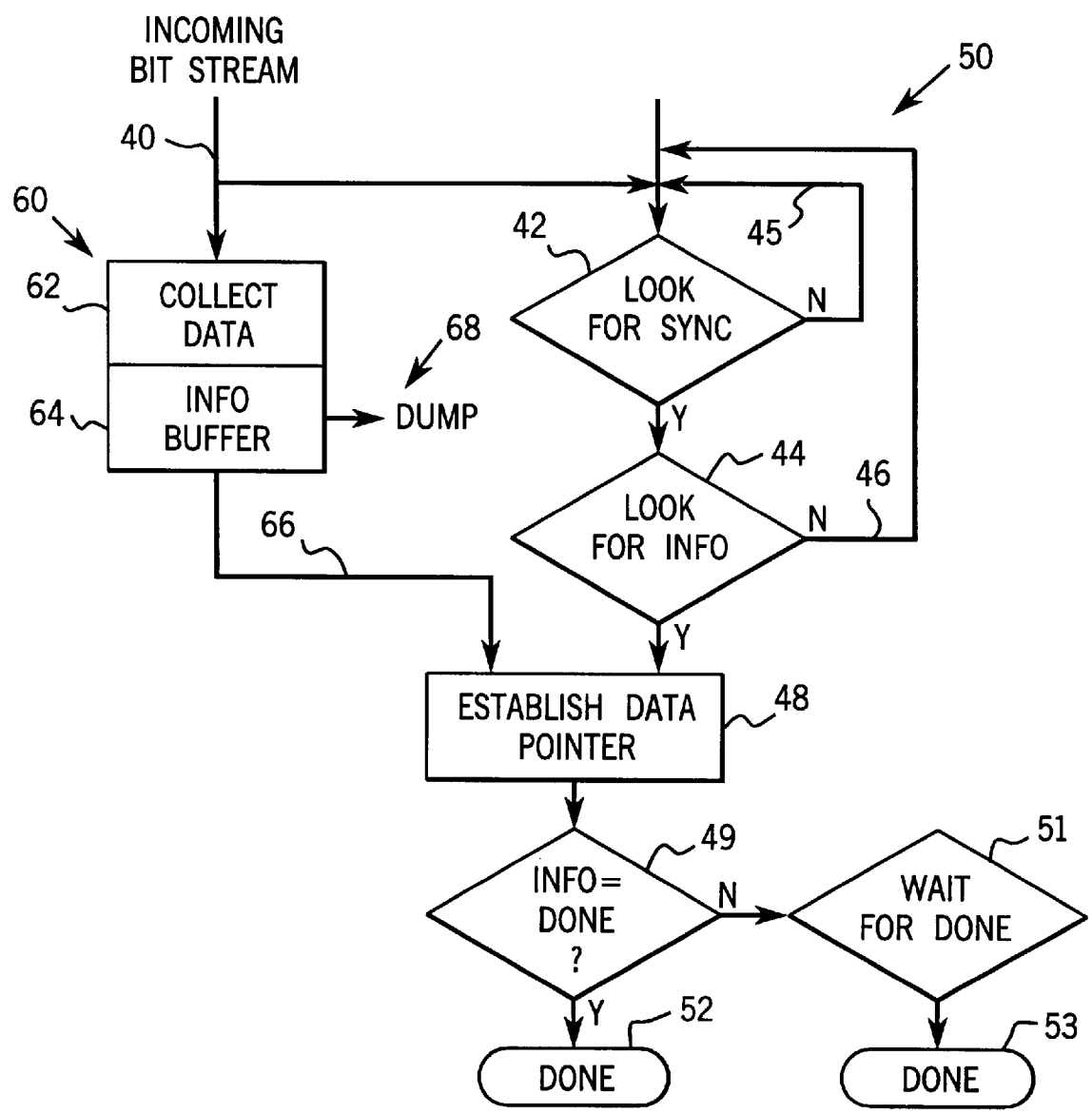

In the present invention, an information packet will be sent during this time period. This identifies the data, the position in the data stream where the packet is located, and how much additional information is to be expected. This signal is monitored at the valid data table 41, permitting the system to look for valid data positions at 43 if a transmission is lost or interrupted. Where desired, an F-E-C singal detector 45 may also be included. Once a transmission is interrupted, or cannot be identified due to the lack of a B-O-M signal or an information packet (see FIG. 2), the system will look into the buffer and retreat all the way to the previous data packet, as identified in the data table 41. The information entered after the interruption and prior to the new information packet may now be recaptured and the entire data stream reconstructed, as shown at 66. When the buffer is full, i.e., when the next information packet is received, the buffer may be dumped, as at 68. Of course, the capacity of the buffer is a matter of choice, but typically, the buffer will have a capacity slightly larger than the amount of data in the bit stream between sequential information packets.

In the preferred embodiment the scheme of the present invention is adapted to utilize a typical mini- or personal computer in combination with a receiving system which may be either stand alone hardware or implemented utilizing the hardware available in the typical computer system. While certain features and embodiments of the invention have been described in detail herein, it will be readily understood that the invention includes all modifications and enhancements within the scope and spirit of the following claims.

What is claimed is:

1. A method for recovering and continuing data transmitted from a sending station to a receiving station when the transmission has been prematurely interrupted, the method comprising the steps of:

a. providing an information signal in a data bit stream for identifying the beginning of a transmission and for identifying the duration of the transmission;

b. transmitting the data bit stream including the information signal from a sending system to a receiving system;

c. collecting and storing the bit stream comprising the transmitted data into a temporary buffer system of a predetermined capacity wherein the first bit in is the first bit out as buffer capacity is exceeded, and wherein the information signal is periodically repeated within said data bit stream, whereby the data can be recovered if lost or if the transmission is interrupted.

2. The method of claim 1, wherein the data information signal is periodically repeated within the data bit stream.

3. The method of claim 2, wherein each data information signal in the data bit stream identifies where in the data bit stream the data information signal is located and the forward and remaining duration of the data bit stream; This may involve calculations: only two points require position and length.

4. The method of claim 1, further including the steps of recalling the transmitted data which has been collected and stored in the event the transmission is interrupted, for reconstructing the data bit stream from the last data information signal forward.

5. The method of claim 4, further including the step of continuing the transmission after the data has been reconstructed.

6. The method of claim 1, including the step of dumping collected data after it has been established that the portion of the data has been properly received by the receiving station.

7. The method of claim 1, wherein the collection and storing step is limited to a specific quantity of data in the data bit stream and wherein the data information signal is repeated within the data bit stream at intervals containing not more than the specific quantity of data within said limits.

8. The method of claim 1, wherein the data information signal is at the beginning of the transmission and includes a beginning-of-message signal.

9. The method of claim 8, wherein the data information signal at the beginning of the transmission includes information identifying duration of the message to be transmitted.

10. The method of claim 1, wherein the data information signal is repeated at the end of the transmission and includes an end-of-message signal.

11. The method of claim 1, wherein the data information signal includes information identifying where within the message the specific data information signal is located and the length of transmission, on data to calculate the above.

12. The method of claim 11, wherein each specific data information signal includes information identifying the duration of the message signal remaining after the specific data information signal.

13. The method of claim 11, wherein each specific data information signal includes information identifying the duration of the message signal which has been transmitted prior to the specific data information signal.

14. The method of claim 11, wherein each specific data information signal includes information identifying the duration of the message signal which has been transmitted prior to the specific data information signal and information identifying the duration of the message signal remaining after the specific data information signal.

15. The method of claim 1, wherein the buffer has a capacity equal to at least the duration of data between adjacent data information signals.

* * * * *